United States Patent
Hose

(10) Patent No.: US 7,376,433 B1
(45) Date of Patent: May 20, 2008

(54) SUBSCRIBER DELIVERED LOCATION-BASED SERVICES

(75) Inventor: David Hose, Boulder, CO (US)

(73) Assignee: Openwave Systems Inc., Redwood City, CA (US)

(*) Notice: Subject to any disclaimer, the term of this patent is extended or adjusted under 35 U.S.C. 154(b) by 14 days.

(21) Appl. No.: 11/016,533

(22) Filed: Dec. 17, 2004

Related U.S. Application Data

(63) Continuation of application No. 09/707,079, filed on Nov. 6, 2000, now Pat. No. 7,024,205, which is a continuation-in-part of application No. 09/119,493, filed on Jul. 20, 1998, now abandoned.

(51) Int. Cl.
*H04Q 7/20* (2006.01)

(52) U.S. Cl. ............... 455/466; 455/403; 455/405; 340/391; 340/905

(58) Field of Classification Search ............ 455/456.1, 455/456.2, 456.3, 517, 67.1, 524, 457, 466, 455/403, 405; 340/905, 391
See application file for complete search history.

(56) References Cited

U.S. PATENT DOCUMENTS

| | | | | |
|---|---|---|---|---|
| 6,067,529 A | * | 5/2000 | Ray et al. ............ | 705/26 |
| 6,070,083 A | * | 5/2000 | Watters et al. ......... | 455/517 |
| 6,088,598 A | * | 7/2000 | Marsolais ............. | 455/566 |
| 6,108,533 A | * | 8/2000 | Brohoff ............... | 455/414.3 |
| 6,115,601 A | * | 9/2000 | Ferreira .............. | 455/406 |
| 6,157,841 A | * | 12/2000 | Bolduc et al. ......... | 455/456.5 |
| 6,208,857 B1 | * | 3/2001 | Agre et al. ........... | 455/428 |
| 6,335,693 B1 | * | 1/2002 | Takahashi et al. ...... | 340/905 |
| 6,353,743 B1 | * | 3/2002 | Karmel ................ | 455/456.5 |
| 6,393,119 B1 | * | 5/2002 | Conley ................ | 379/220.01 |
| 2006/0252427 A1 | * | 11/2006 | Bridges et al. ........ | 455/435.2 |

* cited by examiner

*Primary Examiner*—William Trost
*Assistant Examiner*—Julio Perez
(74) *Attorney, Agent, or Firm*—Townsend and Townsend and Crew LLP

(57) ABSTRACT

A method and apparatus are disclosed for providing subscriber delivered and personalized location-based services. In one embodiment, the invention is implemented in an intelligent wireless network (100). A subscriber initiates the location-based service process by entering a service request using a wireless telephone (102). The request is transmitted to an intelligent network platform (112) via cell site equipment (108) and MSC (110). An application implementing the process that runs on the platform (112) receives subscriber profile information (114), location finding equipment inputs (116) and service information (118) related to the service request. Based on these inputs, the application selects location-based service data that is transmitted to the telephone (102) via a data server (120), the MSC (110) and the cell site equipment.

20 Claims, 4 Drawing Sheets

SUBSCRIBER DELIVERED LOCATION-BASED SERVICES

CROSS REFERENCES TO RELATED APPLICATIONS

This application is a continuation of U.S. patent application Ser. No. 09/707,079, filed Nov. 6, 2000 now U.S. Pat. No. 7,024,205, which is a continuation-in-part of U.S. patent application Ser. No. 09/119,493, filed Jul. 20, 1998, now abandoned. The above applications and all the references cited in this application are incorporated by reference.

BACKGROUND OF THE INVENTION

Field of the Invention

The present invention relates in general to location-based services for communications networks and, in particular, to subscriber delivered location-based services involving the delivery of location-based information to a network subscriber, and to personalized location-based services involving the selection or delivery of location-based services based on subscriber profile information. The invention is particularly advantageous for use in connection with various location-based services for wireless telecommunications networks.

Wireless telecommunications networks generally allow for communication between subscriber wireless transceivers, e.g., wireless telephones (analog or digital cellular and PCS), pagers or data, terminals that communicate using RF signals. In recent years, a number of location-based service systems have been implemented or proposed for wireless networks. Such systems generally involve determining location information for a wireless transceiver and processing the location information to provide an output desired for a particular application.

Examples of such existing or proposed applications include emergency or "911" applications, location dependent call billing and vehicle tracking. In 911 applications, the location of a transceiver is determined when the transceiver is used to place an emergency call. The location is then transmitted to a local emergency dispatcher to assist in responding to the call. In typical location dependent call billing applications, the location of a transceiver is determined, for example, upon placing or receiving a call. This location is then transmitted to a billing system that determines an appropriate billing value based on the location of the transceiver. Vehicle tracking applications are used, for example, to track the location of stolen vehicles. In this regard, the location of a car phone or the like in a stolen vehicle can be transmitted to the appropriate authorities to assist in recovering the vehicle.

While such applications or proposed applications have generated considerable excitement in the industry, there is a desire to expand the functionality of such applications.

BRIEF SUMMARY OF THE INVENTION

The present invention is directed to subscriber delivered or personalized location-based services for communications networks including wireless telecommunications networks. It has been recognized that the functionality of location-based services can be significantly expanded by providing for interaction between the subscriber equipment and the network equipment implementing the location-based services, i.e., by receiving a service request from the subscriber equipment (or otherwise receiving an input indicative of the subscriber's location) and delivering to the subscriber equipment information based, at least in part, on the location of the subscriber equipment. Such interaction allows the subscriber equipment to be used to provide location-based information to the subscriber, i.e., regarding local traffic, construction or weather conditions, or regarding local services, i.e., the location of hotels, stores, food outlets, towing services, service stations, etc. Moreover, in the case of wireless telecommunications networks, such interaction allows service providers access to the substantial number of wireless network subscribers.

It has also been recognized that the functionality of location-based services in wireless or other communication networks can be enhanced by personalizing the services provided, that is, by processing a location-based service request based, at least in part, on stored information regarding the subscriber. Such subscriber information may include, for example: account numbers, credit card numbers or other financial information; lodging information such as smoking preference, room requirements, pricing limitations, discount programs, etc.; favorite restaurants; automobile service plans; and/or a wide variety of other subscriber information. Such information allows the location based services to be tailored for the subscriber. In addition, such information allows the subscriber to direct transmission of sensitive information via secure channels. Either or both of these interactive and personalized characteristics can be provided in accordance with the present invention.

According to one aspect of the invention, a method is provided for implementing interactive location-based services in a wireless communications network such as a cellular or PCS telephone network or a data network. The method involves receiving a service request transmitted by a network subscriber using a wireless transceiver or otherwise receiving a subscriber location input. For example, in a wireless telephone network, a service request may be transmitted using a designated keypad service code (e.g., *TRAFFIC, *HOTEL, *TOW, *PIZZA, *ATM, etc.) or, in the case of an enhanced phone, by scrolling through a menu or otherwise entering a menu selection. Other ways of transmitting a service request include entering a command by voice or touchpad. Alternatively, an input may be received based on other transceiver/network communications such as upon registration or periodic polling conducted for call routing purposes. The method further involves obtaining subscriber location information and selecting service information based on the location information and the service request.

The location information may be based on an output from any suitable location finding equipment (LFE) or a combination thereof. Examples of such LFE's include network based systems that determine transceiver location based on analysis of signals communicated between network equipment and the transceiver, e.g., cell/sector, microcell, angle of arrival (AOA), time of arrival (TOA) and/or time delay of arrival (TDOA) systems, and external systems that determine location based on signals from external sources, e.g., Global Positioning System (GPS) signals. Such LFE inputs may be used in raw form or, more preferably, may be processed in conjunction with other LFE inputs, mapping information or the like to provide enhanced location information. The location information can thus be compared to stored data relative to the service request to identify service information responsive to the service request. For example, if the service request was a traffic inquiry, responsive service information may include any available traffic information for the subscriber's location, or a menu of available traffic information, e.g., indexed by road and travel direction. In the case of a lodging request, the service information may relate to the nearest hotel or a menu of local hotels satisfying certain criteria as will be understood from the description below. Alternatively, the delivery of service information may be initiated by a network administrator or third party. For example, in the case of a traffic accident, local evacuation or other emergency, the appropriate authorities may direct an emergency message to all transceivers within a specified area.

The method further involves outputting the selected service information to the subscriber via the wireless transceiver. In this regard, the selected service information may be provided or made available to a network, data server or other voice or data network components for transmission to the transceiver, e.g., via a mobile switching center (MSC) intelligent peripheral, adjunct processor or other Service Control Point or data network structure. The service information can be provided to the user on a visual display of the transceiver, as an audible, recorded message, or through any other appropriate means. In cases where the service information is provided as a menu of selections, the method may further involve receiving a menu selection entered by the user and outputting further service information in response to the menu selection. If desired, the subscriber may be directly connected to a service provider as a result of the service request. By virtue of the interactive nature of such service request processing, the functionality of information based services can be greatly increased. In addition, service providers and advertisers may be allowed access to large numbers of wireless network subscribers on a location-dependent basis, thereby creating or enhancing a market for a variety of location based services.

The service may be further refined by using LFE outputs to identify the location of a target service provider. For example, the subscriber may desire to locate a mobile service provider such as a nearby taxi or courier. In other cases, a network administrator may allow service providers to register in a location-based service provider database using a wireless transceiver. In such cases, LFE(s) may be used to determine the location of the service provider based on the registration communications and the appropriate location information can be indexed to the service provider in the service provider database. In either case, the delivery of location-based service information to the subscriber may involve receiving an LFE-based input regarding the service provider's location and providing service information to the subscriber based on the LFE based input regarding the service provider's location. Optionally, both the location of the subscriber and the location of the service provider may be determined based on LFE inputs and the service information may be delivered to the subscriber based on both such inputs. In this regard, a network administrator may generate revenues based on fees charged to the service provider and/or subscriber in connection with accessing the location-based services system, for example, on a per-use or periodic basis.

According to another aspect of the present invention, a method is provided for implementing personalized location-based services in wireless or other communications networks. The method involves: receiving a service request from a network user requesting access to a location based service; obtaining location information for the user based on the origination location of the service request, e.g., wireline network node or wireless transceiver location; accessing stored user profile information for the user based on the service request; using the location information and the profile information to determine user service information responsive to the service request and providing an output including the user service information.

The profile information may include any of various recorded personal data for the user. For example, such information may include financial, lodging and other information as described above, or any other information useful in personalizing location-based services. Such profile information can be used to identify service information responsive to a service request (for example, the nearest hotel meeting the lodging criteria stored in the user's profile) or in otherwise processing a service request (for example, transmitting credit card information from the user profile to a selected hotel). The output may be provided to the user and/or to a third-party. In this manner, the profile information can be used in combination with the location information to personalize location-based services. The invention further includes location-based service apparatus generally corresponding to the interactive and personalized location based service methodologies as set forth above.

BRIEF DESCRIPTION OF THE DRAWINGS

For a more complete understanding of the present invention and further advantages thereof, reference is now made to the following Detailed Description taken in conjunction with the drawings, in which.

DETAILED DESCRIPTION OF THE INVENTION

In the following description, the invention is set forth in the context of specific interactive and personalized location-based service systems implemented in a wireless telecommunications network. However, it will be appreciated that certain aspects of the present invention are more broadly applicable to other subscriber delivered or personalized location-based services and to other types of communications networks including wireline communications networks such as voice and/or data networks such as voice and/or data networks. In addition, although certain characteristics of the invention will be described in relation to an intelligent telecommunications network, it will be appreciated that the invention is not limited to such implementations.

Figure 1:
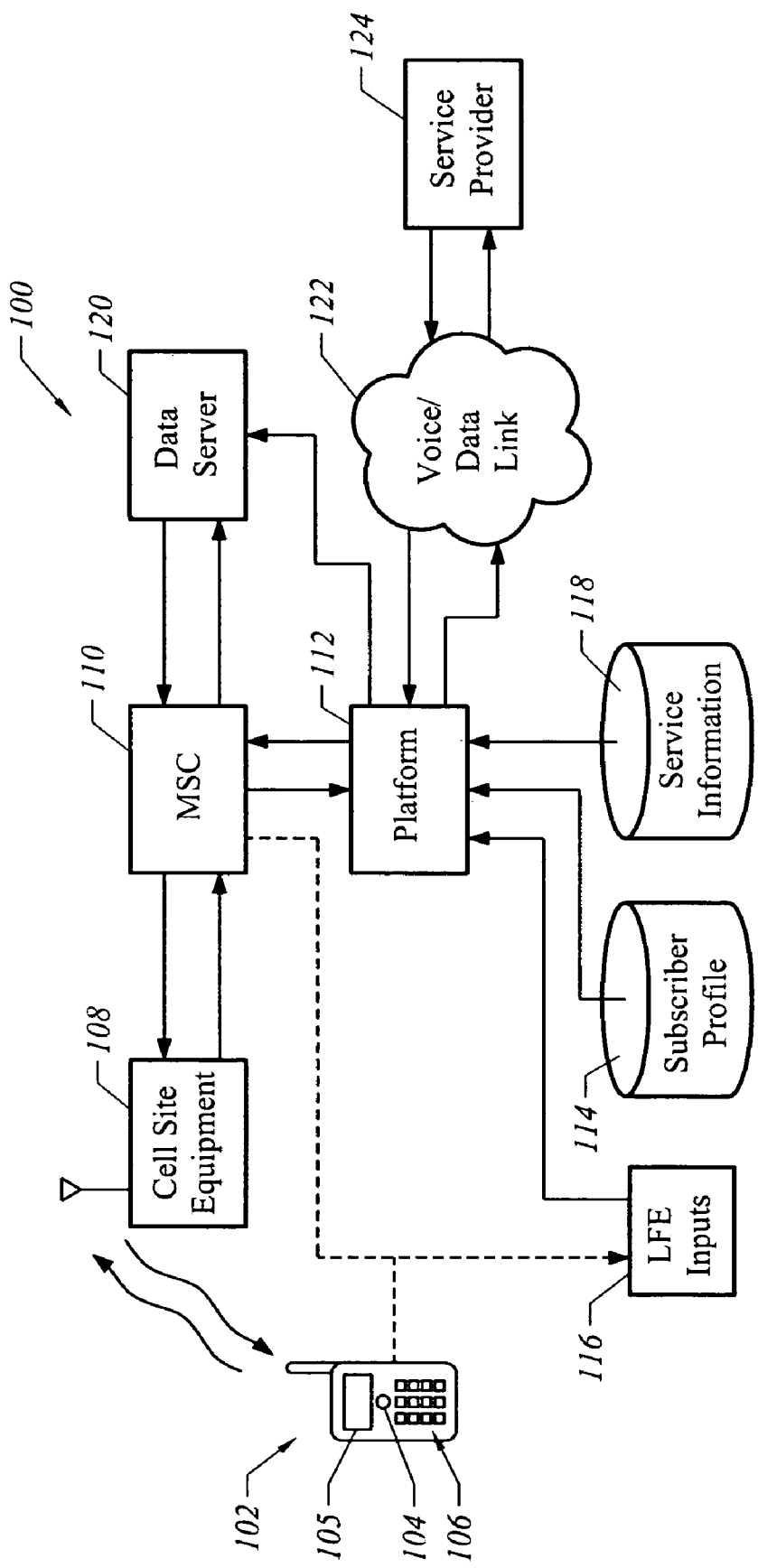
FIG. 1 is a diagram of a wireless telecommunication system implementing interactive and personalized location-based services in accordance with the present invention.

Referring to FIG. 1, a wireless telecommunications network implementing the interactive and personalized location-based service system of the present invention is generally identified by the reference numeral 100. Although not shown, the network 100 is divided into a number of service areas or cells. Each cell includes cell site equipment 108 for receiving RF signals from wireless telephones 102 of network subscribers and transmitting RF signals to the wireless telephones 102. The cell site equipment 108 of multiple cell sites are, in turn, connected to a Mobile Switching Center (MSC) 110, typically by wireline connections. Among other things, the MSC 110 is used in establishing voice channels for communication between the calling and called phones. The MSC also provides information for generating call detail records or other billing records.

In connection with the MSC 110, one or more intelligent network platforms 112 are generally provided for implementing a variety of subscriber or network service functions. For example, the intelligent network platform 112 may implement an application for routing call based on subscriber data. In the illustrated embodiment, the intelligent network platform 112 is used to run logic for implementing the interactive and personalized location based services as will be described in greater detail below.

In this regard, the illustrated platform 112 includes ports for accessing and receiving optional subscriber profile information 114, LFE inputs 116 and service information 118. The subscriber profile information 114 includes information regarding individual subscribers that is useful in personalizing the location-based services and in processing individual service requests. Some examples of such information include: 1) financial information for use in executing a location-based service transaction such as credit card numbers and expiration dates, bank account numbers, or corporate account information; 2) service preference information such as hotel room requirements, information regarding discount programs or club memberships, and preferred chains or other service providers; 3) information regarding the subscriber's service usage profile such as typical travel times and roads, types of services most often requested by the subscriber and demographic information; and 4) the subscriber's willingness or desire to receive complementary service information and advertisements. Such profile information may be entered by a carrier or other location based service administrator upon signing up for the service and may be periodically revised or automatically revised based on adaptive logic.

The LFE input(s) 116 may be provided in various forms. As noted above, many types of LFEs are available. In most cases, such LFEs determine the location of the telephone based on analysis of signals transmitted between the telephone system and one or more cell sites, e.g., cell/sector, microcell, AOA, TOA, TDOA, etc. In such cases, the LFE may receive information from the wireless telephone 102, the cell site equipment 108, and/or the MSC 110. In other cases, the telephone location is determined by reference to an external system such as GPS and the LFE may receive information from a GPS transceiver embodied in the telephone 102. The particular system or systems used determines the nature and accuracy of the received data. The illustrated platform 112 preferably receives information from multiple (two or more) LFEs and implements logic for using the multiple inputs to provide enhanced location information. In this regard, such logic may select, from among the multiple inputs, the best information for a particular application (most timely, most reliable, most accurate or best availability based on terrain/climate) and/or may process multiple inputs to obtain enhanced position information that is more accurate, more reliable or more informative (e.g., includes derivative information such as travel direction/rate) than single inputs. In addition, such logic may process the LFE 116 inputs relative to mapping information such as GIS data and/or service zones of a particular service provider to yield processed information data. The illustrated platform 112 also accesses and receives service information 118. Various types of service information may be provided for various location-based services. For example, for services such as locating food outlets, hotels, service stations, towing services or other service providers in the vicinity of the subscriber, the service information may include a database of service providers indexed to corresponding service locations. Such service locations may be stored in the form of latitude/longitude data corresponding GIS or street address data, zip codes or other regional/service area indicators, or any other appropriate identifiers. For other types of services such as, for example, traffic or road conditions, stored information for particular areas or locations may be updated on a regular basis or, alternatively, the platform may be linked to an external source of real-time or near real-time information. Alternatively, as described in more detail below, the service information may involve stored or substantially real-time information regarding the location of a service provider.

The subscriber profile information 114, service information 118 and LFE information 116 or enhanced position information is used in the illustrated implementation of the present invention to provide location-based service information. It will be appreciated that this location-based service information can, optionally, be personalized based on the subscriber profile information 114. For example, in the case of providing local food outlet, service station or hotel information, the location-based service information can include not only information regarding service providers in the vicinity of the subscriber, but can also identify local service providers or services meeting criteria specified by the profile information 114. The location-based service information may therefore identify a local hotel that has a four star rating and conference rooms, and that accepts credits cards and participates in a particular corporate discount plan, or it may identify the closest ATM machine that does not charge a transaction fee.

The illustrated network 100 also includes a data server 120 associated with the platform 112 and the MSC 110. The data server 120 provides an interface by which information can be communicated between the platform 112 and subscribers or third parties. The data server 120 may also receive signals from the MSC 110 such as call start signals, call stop signals and the like that may be transmitted to billing systems or other applications. As shown, the data server 120 receives an input from the platform 112 that may include location-based service information to be transmitted to the subscriber or third parties. In the case of location-based service information (such as the location of a local service provider or a menu of service providers) to be transmitted to the subscriber, such information is communicated to the subscriber via the MSC 110 and cell site equipment 108. More specifically, upon receiving a service request, the MSC transmit service request information to an intelligent network application associated with platform 112. The application responds, with call routing that prompts the MSC 110 to establish a communication channel between the phone 102 and the data server 120. This channel is then used to communicate the location-based service information from the data server 120 to the phone 102 for audible or visual presentation to the subscriber. The data server 120 may also or alternatively be used to transmit data to third parties such as an identified service provider 124. For example, upon identification of the service provider 124 based on the subscriber's service request, the subscriber may request a direct voice connection to the service provider 124 or may request that financial information or other data be transmitted to the service provider 124 to process a service transaction. In this regard, an appropriate voice and/or data link 122 may be established between the data server 120 or the MSC 110 and the service provider 124 via the network 100 and/or a further network such as the Internet. It will thus be appreciated that the interactive location-based service process of the present invention may involve a series of communications with the phone 102.

The illustrated phone 102 is an enhanced phone, i.e., a phone adapted for voice and data communication with a built-in processor. The phone includes a conventional keypad 106, a roller ball, arrow keys, touchpad or other data input device 104, and a screen 105 for displaying data. In this manner, the subscriber can enter service requests via the keypad 106 or data input device 104, and can receive service information audibly or via the display 105.

Figure 2:
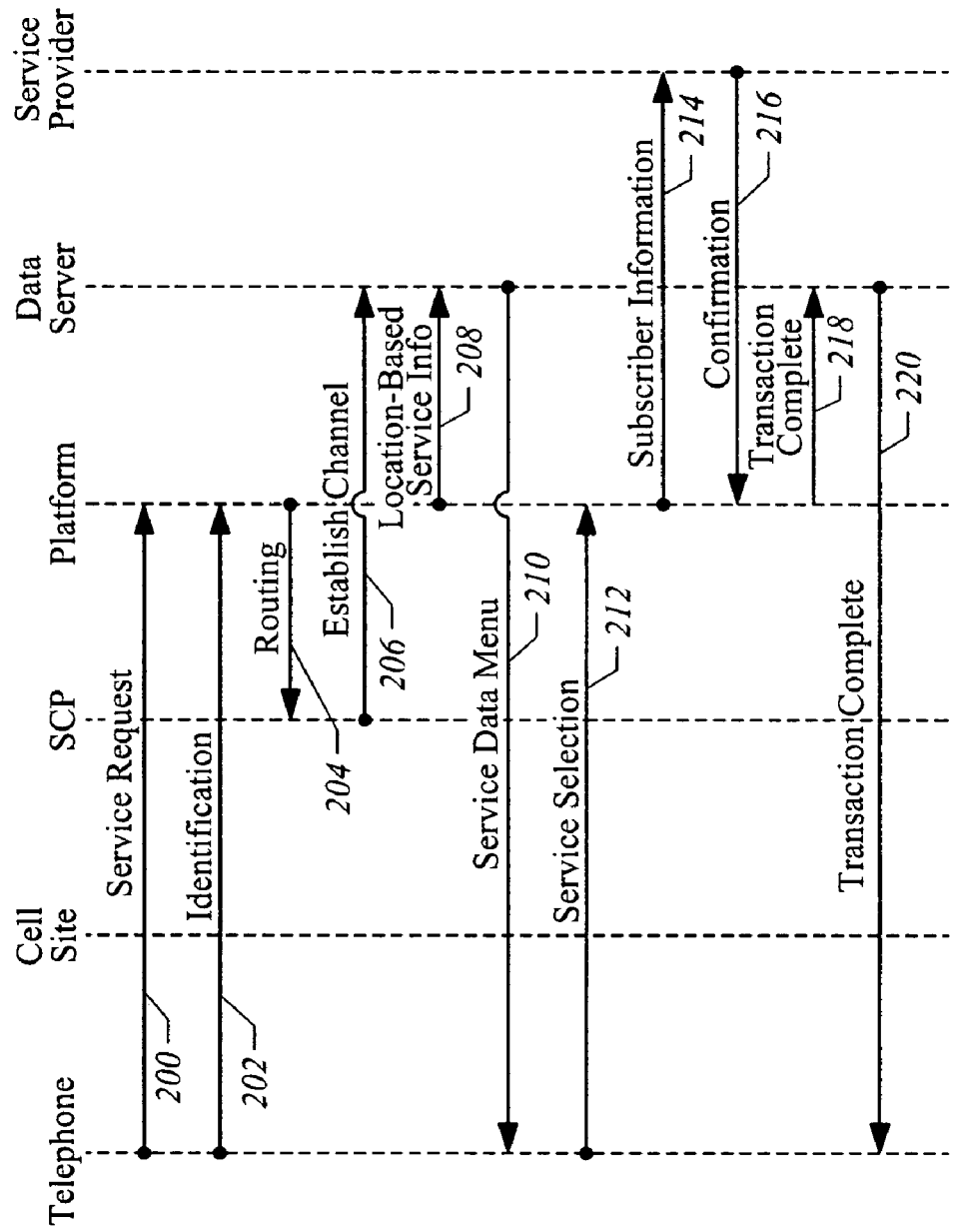
FIG. 2 illustrates an example of signal communications between the various elements of the telecommunication system of FIG. 1 in accordance with the present invention.

FIG. 2 illustrates an example of a series of signals that may be transmitted between the various elements of the network in connection with a particular location-based service process. As shown in FIG. 2, the process is initiated with a service request 200 transmitted from the telephone to the platform by way of the cell site equipment and MSC. The service request may be entered for example, via the telephone keypad or by using the input device. For example, in an intelligent wireless network, particular service requests may be associated with a specific keypad entry such as *TRAFFIC, *HOTEL, *TOW, *PIZZA, *ATM, etc. Alternatively, a menu of available location-based services may be programmed into the telephone for selection using the data input device. Certain identification information may also be transmitted with the service request. In response to receiving the service request, the intelligent network application associated with the platform transmits routing information and transmits a validation 204 to the MSC. This routing information prompts the MSC to establish (206) a communication channel with the correct data server.

Once this data channel is established between the MSC and the data server, the location-based service application of the present invention can communicate with the telephone via the data server and/or the MSC. In this regard, location-based service data 208 is transmitted from the platform to the data server. In the illustrated case, this location-based service data 208 includes a menu of local service providers based on the service request. This service data menu is communicated (210) from the data server to the telephone via the MSC and cell site. For example, the menu may include a selection of hotels in the vicinity of the subscriber. This menu is displayed on the telephone such that the user can scroll through the menu and make a selection using the telephone's input device. This selection is then transmitted from the telephone to the platform via the cell site and MSC.

The signal flow diagram of FIG. 2 illustrates a case where the subscriber directs profile information to be transmitted from the platform to the service provider. For example, the subscriber may direct the location-based service application running on the platform to transmit credit card or other subscriber information to a selected hotel or other service provider in order to consummate a transaction. As shown, such subscriber information is transmitted from the platform to the service provider by way of the data server. The service provider may then transmit a confirmation signal in response to the subscriber information. The confirmation signal 216 is routed to the platform by way of the data server. The application can then notify the subscriber that the transaction has been completed. As shown, this is accomplished by transmitting a transaction complete signal 218 from the platform to the data server and then from the data server to the telephone (220) via the MSC and the cell site.

Figure 3:
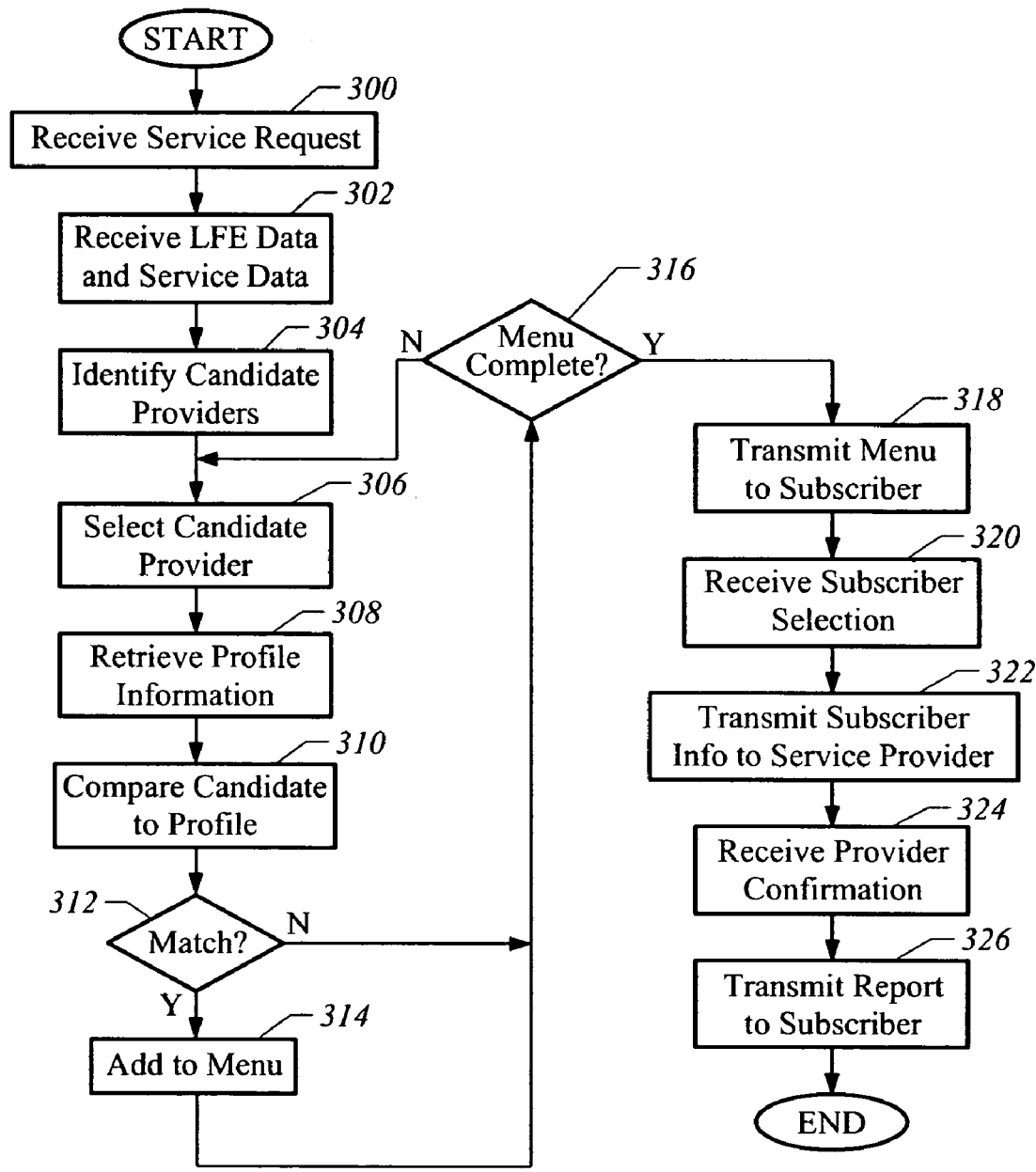
FIG. 3 is a flowchart illustrating an interactive and personalized location-based service process in accordance with the present invention.

FIG. 3 illustrates a process implemented by the location-based service system of the present invention. The system may be installed, for example, at the platform associated with the MSC. The illustrated process is initiated by receiving (300) a service request from the subscriber telephone indicating that a particular location-based service is desired. In response to the received request, the system accesses and receives (302) LFE data and service provider data. This information provides an indication of the subscriber's current location as well as the locations of various service providers. The system compares the received LFE data and service information to identify (304) candidate service providers based on location. Any suitable technique can be employed in this regard. For example, the system may determine the location of the subscriber telephone, identify a service area relative to that location and compare the service area to a service provider data base to identify service providers (of the type indicated by the service request) in that area. The service area may be defined based on the subscriber telephone location (e.g., a radius search for service providers within a given radius of the 5 telephone location) or the service areas may be predefined. In the case where the service areas are predefined, the relevant service area can be determined, for example, by identifying the service area in which the subscriber telephone is located (e.g., a point-in-polygon analysis).

In the illustrated implementation, the subscriber profile is used to identify one or more appropriate service providers from the candidate service providers. Specifically, the system first selects (306) a candidate provider from the list of candidate service providers. The system then retrieves (308) the subscriber profile information and compares (310) the candidate provider to the profile information. If such comparison indicates a match (312), the candidate service provider is added (314) to a menu to be provided to the subscriber. This process is repeated until all candidate service providers have been analyzed. Once the menu of service providers is complete (316), the menu is transmitted (318) to the subscriber telephone where the menu is displayed or otherwise provided to the subscriber. The menu may be ordered based on any of various criteria such as the preferences expressed in the subscriber profile, nearest to farthest, preferred service providers defined by the network administrator, etc. In response, the subscriber selects a service provider from the menu and the selection is received (320) by the system. The subscriber may further indicate a desire to contact the selected subscriber to consummate the transaction. In this case, subscriber information such as a credit card number and expiration date is transmitted (322) to the service provider. The service provider may also be prompted to return a transaction confirmation. This confirmation is received (324) by the system and, in turn, transmitted (326) to the subscriber to complete the process.

It will be appreciated that revenues may be generated from the subscriber and/or service providers based on use of the location-based services system. In this regard, the subscriber and service provider may be charged a flat fee, for example, on a monthly basis. Alternatively, fees may be based on usage, e.g., number of uses, duration of uses, type of uses, etc. In the latter case, the location-based services application running on the intelligent network platform may be programmed to provide an appropriate billing program output in connection with service requests or location based service transactions. For example, the location based services application may cause available fields of a call detail record or other billing record to be populated with the appropriate billing parameters (for example, a subscriber identifier, a service provider identifier, a service type identifier, etc.). Such records are commonly transmitted by the MSC to the billing program in connection with each call. Cooperating routines of the billing program can then be used to create bills for the subscriber or service provider based on the service request or transaction.

Figure 4:
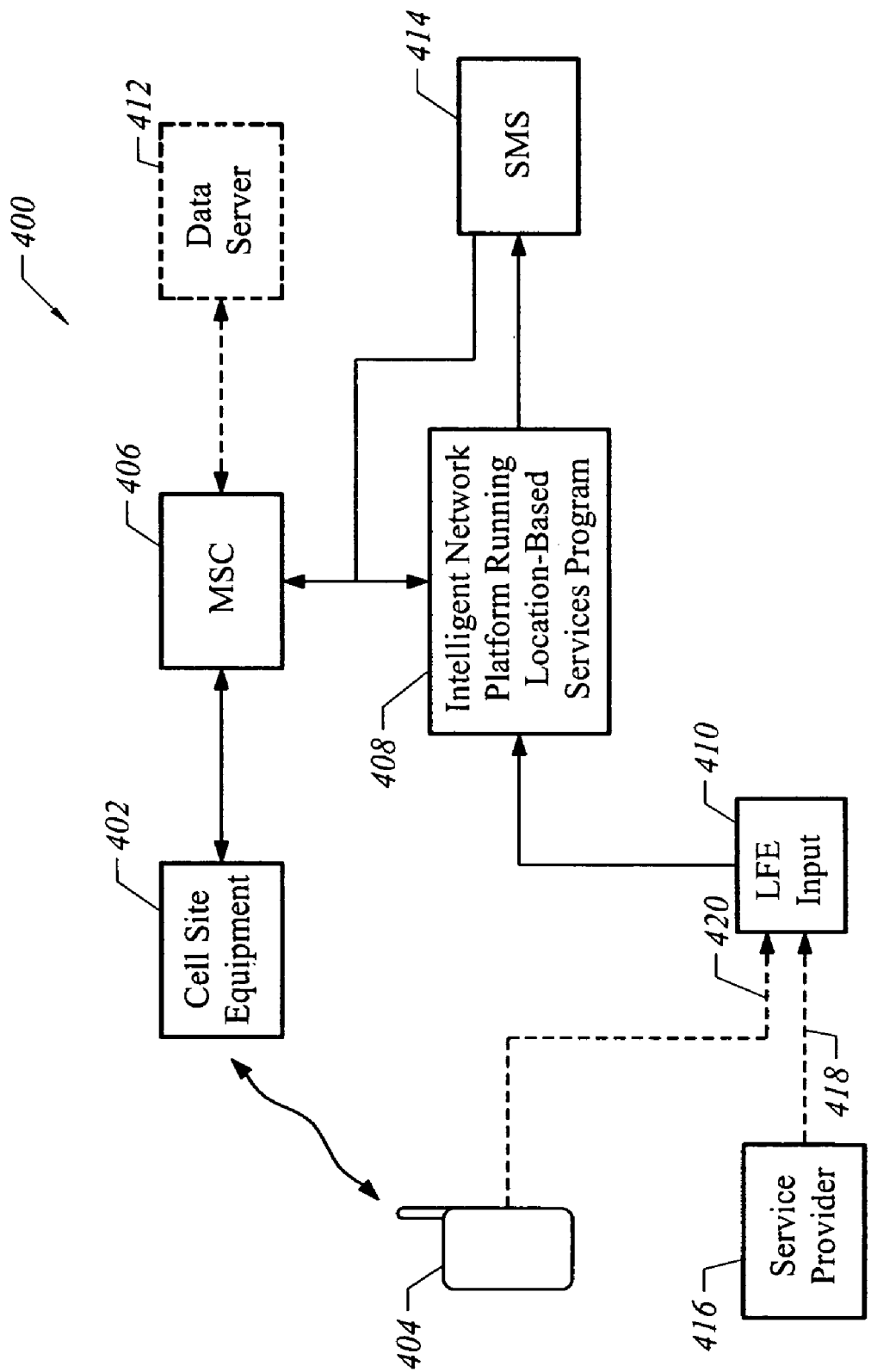
FIG. 4 is a diagram of a wireless telecommunications system implementing interactive and personalized location-based services in accordance with an alternative implementation of the invention.

FIG. 4 shows an alternative implementation of the present invention in a telecommunications network 400. The network 400 includes cell site equipment 402 for communicating with a subscriber's wireless telephone 404, and an MSC 406 and an intelligent network platform 408 as described above. In addition, the network 400 illustrates a number of implementation options in accordance with the present invention. These include obtaining service provider location information via an LFE input 410, providing a short message system (SMS) 414 to provide audible or voice messages to the telephone via the MSC 406 and thereby optionally avoiding the need to establish communications with a data server 412.

In a variety of contexts, it may be desirable to obtain stored or substantially real time information regarding the location of a service provider 416 via an LFE input 410. For example, in the case of a mobile service provider such as a taxi, courier or police unit, it may be important to determine a current location of service provider 416. In other cases, it may be expedient to allow a stationary or mobile service provider with a wireless transceiver to enter or update its location via an LFE input 410. In either case, such self-provisioning of the service provider location information can be provided by using the LFE equipment associated with the network 400. For example, a network administrator such as a wireless carrier may provide a registration process for service providers whereby the service providers call-in on a wireless telephone to register in a service provider database that is accessed by the location-based services program running on the platform 408. Based on this call, the LFE can be operated, as generally indicated by broken line 418, to provide an LFE input 410 indicative of the location of the service provider 416. Alternatively, a service provider may enter a position, and optionally a service type, at any time by entering a designated code on a wireless telephone, e.g., * locate or * locate ###. It will be appreciated that a telephone identifier derived from the transmission may be used in conjunction with the designated code to obtain the desired service provider information. In the case of a mobile service provider, the LFE may continuously or periodically monitor the location of the service provider 416 to provide an LFE input 410 indicative of the service provider's current location. It will thus be appreciated that the illustrated implementation may involve first operating (418) the network LFE to obtain a first LFE input 410 regarding the location of a service provider 416 and second operating the network LFE, as generally indicated by broken line 420, to obtain a second LFE input 410 regarding the subscriber's phone 404, e.g., upon receiving a service request.

FIG. 4 also illustrates the use of an SMS 414 to provide an audible or voice message. For example, the SMS may store a library of such messages for various service providers or may be operable to generate such messages in response to a service request, e.g., "The nearest ATM is located at [address]." The SMS 414 can be provided in conjunction with the platform 408 to allow for responding to the service request via the MSC without the need to establish a separate communications channel with a data server 412. If desired, however, the response may be transmitted to the subscriber using the data server 412 or both the data server 412 and SMS 414.

The service request from the subscriber and response from the SMS 414 and/or data server 412 need not take place during a single call/communication. In this regard, the subscriber may transmit a service request and hang-up, or the location-based services program may receive the service request, transmit an acknowledgment and then generate a hang-up signal. In either case, the program may obtain and store a phone number or other subscriber identifier and, thereafter, process the service request, obtain location-based service information and cause the service information to be transmitted to the subscriber's phone 404, pager, wireless data terminal or other wireless transceiver. For example, at some time after the service request is transmitted and that call has been terminated, perhaps 30 seconds later, an address or other information responsive to the subscriber may be transmitted. In the case of a telephone, a "ping" ring, light or other indication may be used to notify the subscriber that the information is available.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method of providing location-based services to a subscriber of a wireless network, the method comprising:
   storing, on the network platform, subscriber profile information regarding the subscriber, the subscriber using a mobile unit;
   thereafter receiving, on a network platform in communication with the subscriber, a service request from the mobile unit requesting information regarding the location-based services;
   obtaining, on the network platform, location information regarding a location of the mobile unit;
   identifying, on the network platform, a plurality of candidate service providers from a database of service providers, based upon the location of the mobile unit;
   identifying, on the network platform, service provider information associated with the plurality of candidate service providers;
   selecting, on the network platform, a subset of the plurality of candidate service providers based on the subscriber profile information, wherein selecting a subset comprises not selecting at least one of the plurality of candidate service providers;
   outputting information regarding the subset of the plurality of candidate service providers to the mobile unit;
   receiving an input from the mobile unit, wherein the input comprises a selection of a preferred service provider;
   transmitting information regarding the subscriber to the preferred service provider;
   initiating a transaction between the subscriber and the preferred service provider based on the information regarding the subscriber; and
   receiving a transaction confirmation from the preferred service provider.

2. The method of claim 1 wherein the location information is determined using a network-assisted location finding technology.

3. The method of claim 1 wherein the plurality of candidate service providers are located in a geographic region surrounding the location of the mobile unit.

4. The method of claim 1 wherein the step of outputting information comprises providing a menu of selections to the mobile unit.

5. The method of claim 4 further comprising receiving, on the network platform, an input from the mobile unit in response to the menu of selections.

6. The method of claim 5 further comprising outputting additional information regarding the subset to the mobile unit in response to the input from the mobile unit.

7. The method of claim 1 wherein the plurality of candidate service providers are mobile service providers.

8. The method of claim 7 further comprising obtaining, on the network platform, mobile service provider location information regarding a location for the plurality of candidate mobile service providers, wherein the step of selecting a subset of the plurality of candidate mobile service providers is based, in part, on the mobile service provider location information.

9. The method of claim 7 further comprising storing mobile service provider profile information in the database of service providers, wherein the step of selecting a subset of the plurality of candidate mobile service providers is based, in part, on the mobile service provider profile information.

10. The method of claim 7 further comprising:
   obtaining, on the network platform, mobile service provider location information regarding a location for the plurality of mobile service providers;
   receiving an input from at least one of the subset of mobile service providers; and
   selecting at least one of the subset of mobile service providers based on the subscriber profile information, the mobile service provider location information, and the input from at least one of the subset of mobile service providers.

11. The method of claim 1 wherein the information regarding the subscriber comprises financial information.

12. The method of claim 11 wherein the financial information comprises at least one of a credit card number and an expiration date, a bank account number, or corporate account information.

13. The method of claim 1 further comprising transmitting the transaction confirmation to the subscriber.

14. The method of claim 1, wherein the plurality of candidate service providers relate to at least one of a food, lodging, or store.

15. A method of providing location-based services to a subscriber of a wireless network, the method comprising:
   storing, on a network platform, subscriber profile information regarding the subscriber;
   thereafter receiving, on the network platform in communication with the subscriber, a service request from a mobile unit associated with the subscriber requesting information regarding the location-based services;
   obtaining, on the network platform, location information regarding a location of the mobile unit;
   identifying, on the network platform, a plurality of candidate service providers from a database of service providers, based upon the location of the mobile unit;
   identifying service provider information associated with the plurality of candidate service providers;
   selecting, on the network platform, one or more of the plurality of candidate service providers based on a comparison between the service provider information and the subscriber profile information;
   not selecting, on the network platform, at least one of the plurality of candidate service providers based on the comparison between the service provider information and the subscriber profile information;
   outputting the service provider information associated with the selected one or more of the plurality of candidate service providers to the mobile unit;
   receiving an input from the mobile unit, wherein the input comprises a selection of a preferred service provider;
   transmitting information regarding the subscriber to the preferred service provider;
   initiating a transaction between the subscriber and the preferred service provider based on the information;
   receiving a transaction confirmation from the preferred service provider; and
   transmitting the transaction confirmation to the subscriber.

16. The method of claim 15 wherein the transmitting information step comprises transmitting financial information regarding the subscriber selected from the subscriber profile information.

17. The method of claim 16 further comprising:
   receiving an additional input from the mobile unit, wherein the additional input comprises additional information regarding the subscriber; and
   transmitting the additional information to the preferred service provider.

18. The method of claim 16 wherein the financial information comprises a credit card number and an expiration date.

19. The method of claim 16 wherein the financial information comprises a bank account number.

20. The method of claim 16 wherein the financial information comprises corporate account information.

* * * * *

UNITED STATES PATENT AND TRADEMARK OFFICE
CERTIFICATE OF CORRECTION

PATENT NO.         : 7,376,433 B1
APPLICATION NO.    : 11/016533
DATED              : May 20, 2008
INVENTOR(S)        : David Hose It is certified that error appears in the above-identified patent and that said Letters Patent is hereby corrected as shown below:

In the Claims:

Claim 1 column 10, line 28:
"on the network platform" should read -- on a network platform --.

Claim 1 column 10, line 31:
"on a network platform" should read -- on the network platform --.

Signed and Sealed this
Third Day of September, 2013

Teresa Stanek Rea
*Acting Director of the United States Patent and Trademark Office*